United States Patent [19]

Schoppe

[11] 4,098,871

[45] Jul. 4, 1978

[54] PROCESS FOR THE PRODUCTION OF POWDERED, SURFACE-ACTIVE, AGGLOMERATABLE CALCINED MATERIAL

[76] Inventor: Fritz Schoppe, Max-Ruttgers-Str. 24, 8026 Ebenhausen, Isartal, Munich, Fed. Rep. of Germany

[21] Appl. No.: 475,874

[22] Filed: Jun. 3, 1974

[51] Int. Cl.$^2$ ............................................. C01F 11/06
[52] U.S. Cl. .................................... 423/177; 423/637; 432/58
[58] Field of Search ...................... 432/14, 15, 23, 58; 34/57 E; 423/177, 635, 175, 637

[56] References Cited

U.S. PATENT DOCUMENTS

| 997,982 | 7/1911 | Floyd | 423/175 |
|---|---|---|---|
| 2,474,207 | 6/1949 | Lovell et al. | 423/635 |
| 2,548,642 | 4/1951 | White | 423/177 |
| 2,650,084 | 8/1953 | White | 423/177 |
| 2,810,667 | 10/1957 | Hohn et al. | 432/23 |
| 2,935,840 | 5/1960 | Schoppe | 60/39.74 R |
| 3,020,646 | 2/1962 | Joseph et al. | 34/57 E |
| 3,140,862 | 7/1964 | Schoppe | 34/57 E |
| 3,221,082 | 11/1965 | Leatham et al. | 423/169 |
| 3,495,949 | 2/1970 | Niedner et al. | 34/57 E |
| 3,796,791 | 3/1974 | Nielsen et al. | 423/177 |
| 3,817,696 | 6/1974 | Hereth | 432/15 |
| 3,839,551 | 10/1974 | Dozsa et al. | 423/635 |
| 3,862,294 | 1/1975 | Engelhart et al. | 423/175 |

FOREIGN PATENT DOCUMENTS

767,949  2/1957  United Kingdom.

OTHER PUBLICATIONS

Riegel, *Industrial Chemistry*, Fifth Edition, 1949, pp. 163-173.
Boynton, Chemistry and Technology of Lime and Limestone, Interscience Publishers (1966), pp. 210, 211, 288, 289, 298-306.

*Primary Examiner*—O. R. Vertiz
*Assistant Examiner*—Wayne A. Lange
*Attorney, Agent, or Firm*—Strauch, Nolan, Neale, Nies & Kurz

[57] ABSTRACT

A process and installation for the production of powdered, surface-active agglomeratable, calcined material, specifically calcined lime, from material or raw material present in the form of sludge, scum or the like, such as the waste materials in the sugar industry. The specific example of the process is production of calcined lime and/or usable $CO_2$ from waste materials existing in the sugar producing industry. The process includes reacting the raw materials in a special mixing chamber under controlled time and temperature conditions, preheating the materials by using the reaction exhaust gases, obtaining calcined lime particles isolated from $CO_2$ gases, and recycling portions of the particles to obtain complete reaction of the material. The process provides calcined lime which can be discharged in solid form or converted through further stages to lime-milk for direct use in sugar making processes. A proposed installation includes various pieces of equipment such as a combustion chamber, a special calcining or reaction chamber which provides parallel flow paths with a turbulent vortex zone within which the raw materials, preferably preheated, are subjected for controlled periods to desired reaction temperatures, various preheaters, dust separators and final storage or mixing units, all units disclosed in an inter-related flow path arrangement for an exemplary installation by which the process can be carried out.

9 Claims, 3 Drawing Figures

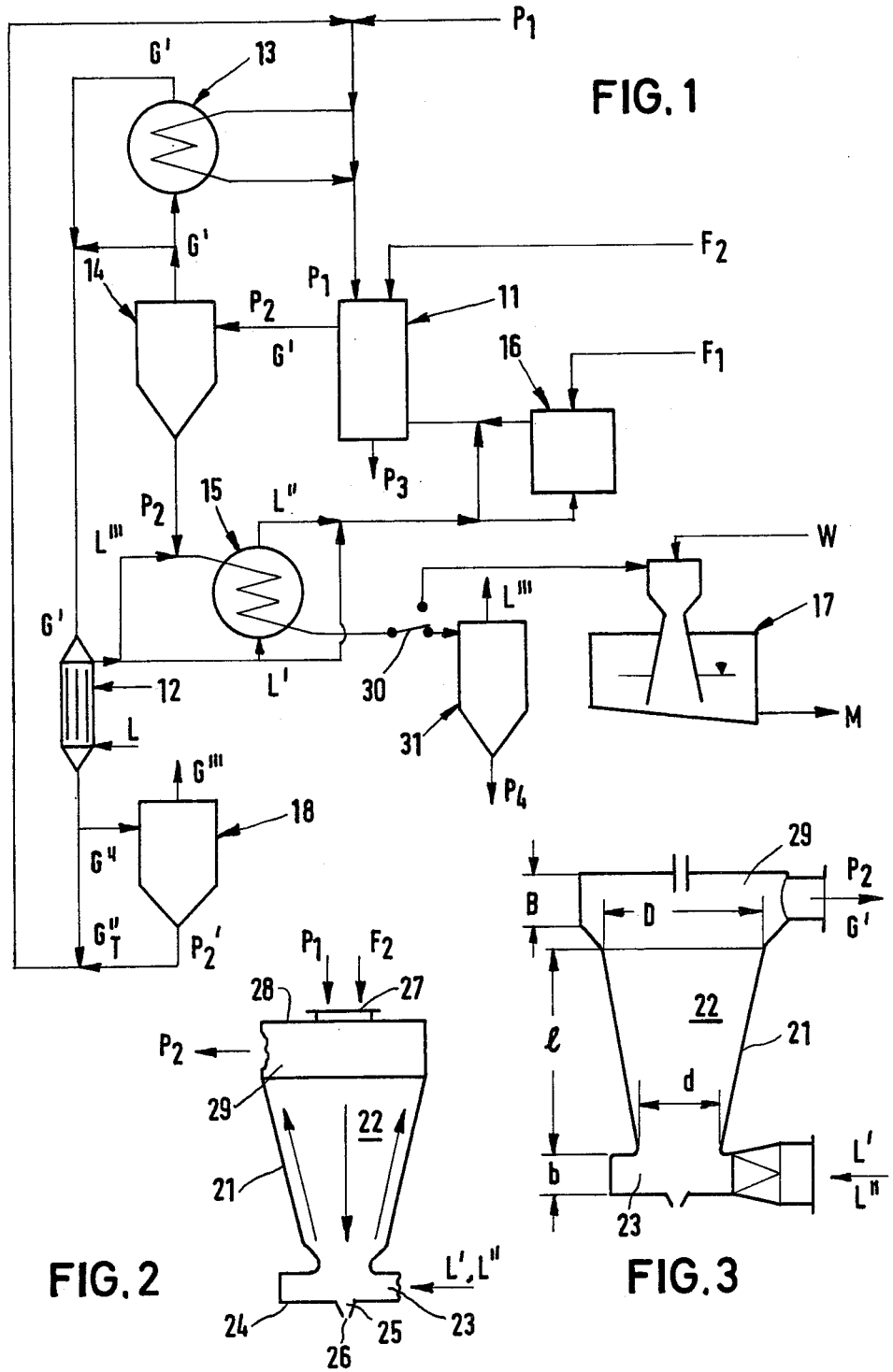

PROCESS FOR THE PRODUCTION OF POWDERED, SURFACE-ACTIVE, AGGLOMERATABLE CALCINED MATERIAL

BACKGROUND OF THE INVENTION

As is known, in the production of sugar a sludge is produced which in addition to lime ($CaCO_3$), sucrose and albumen, contains small quantities of other constituents and has a varying moisture content. Previously, this lime sludge has often been used as fertilizer; in recent years it has usually been simply deposited somewhere, which involves more or less considerable expense. This is not desirable from the point of view of avoiding pollution of the countryside and general environment.

Various attempts have already been made for recovering lime from lime-containing sludge in sugar production works by burning.

For example in the United States of America, some time ago a plant was built with a multi-tier furnace comprising eleven tiers or stages and fired with additional fuel. This plant, however, could achieve only a yield of 65%, since because of the way the plant operated a considerable proportion of the lime was carried away by the discharged gases. Preventing this would have required an expensive installation for extracting dust from the waste gases. According to reports, the operating behaviour of the said plant is not satisfactory.

Again in the United States of America it has already been attempted to calcine lime sludge with a very long and complicated shape rotary tubular furnace. This kind of apparatus can in fact obtain better operating results than that previously mentioned, but the rotary tubular furnace itself and also its operation is so expensive as to prevent it being used in sugar factories even for reasons of cost alone. Furthermore, the furnace does not operate in a troublefree manner, so that there are frequent interruptions in working, more particularly owing to material caking-on in the form of rings in certain zones of the furnace. But with a furnace length of more than 90m these accumulations can be removed only if the furnace is stopped and cooled, and this takes several days.

A primary object of the present invention resides in provision of a unique process for the production of a powdered, surface active, agglomeratable, calcined material from a raw material using combustion gases and exhaust gases to preheat and react the raw materials under temperature and time controlled reacting conditions. A further object resides in isolating the produced powder from reaction gases produced during the reaction.

The invention has a more particular object to make a sensible use of the waste product produced in sugar production, e.g., the lime-containing sludge, and to develop for this purpose a rational process which consists substantially in preparing the lime-containing sludge, using the calorific value of its organic impurities, to obtain CaO again as far as possible, which can then be re-used in sugar production in a particularly simple and economical manner.

In sugar production, lime milk is required and for this purpose the CaO is hydrated and dissolved in water. Therefor, a further object is to produce the CaO in such a form that it is capable of being hydrated and dissolved in water in as easy and rapid a manner as possible. This can be achieved by so controlling the process for the production of CaO that a highly active CaO powder is obtained which reacts chemically and physically very quickly.

Behind the aforesaid objects of the invention there is also the objective of providing a method which enables the construction of and use of novel installations involving low constructional outlay and having high operating flexibility. Apparatus expense is very important more particularly in sugar production since, as is known, sugar producing apparatus are in use only for three to four months in the year, so that the construction outlay, that is to say investment and other capital costs, have about three to four times as much weight as in other branches of industry where the plant can be used uniformly over the entire year. The flexibility of the process, i.e. the possibility of adapting it to various operating conditions, is important since on the one hand the organic constituents in the lime sludge fluctuate considerably, so that different quantities of heat are produced which have to be compensated for, and on the other hand the installation in question must be capable, for example at the beginning of a sugar campaign or under other operating conditions, of dealing if appropriate with even pure $CaCO_3$ or mixtures of $CaCO_3$ and sugar lime sludge.

To solve the aforesaid problems and to obviate the disadvantages of known processes and installations or apparatus for the recovery of lime from lime-containing waste sludges for example in the sugar industry or the like, according to the invention it is proposed to use a process wherein, in detail, the following procedure is used: preheated and predried lime-containing sludge and preheated combustion air and, if necessary, additional fuel are introduced into a chamber and mixed thoroughly with one another, and the combustible constituent are burned. These materials flow through the chamber at least partly in an upward direction from below, the lime particles being subjected to a heat treatment during which they are kept in a state of suspension. Here it is an important objective of this invention that the lime particles are heated as quickly as possible, and in fact with a speed of heating which is above about 400° C/sec; the upwardly directed flow of the air stream carrying the particles has such a speed that the average time of residence of the lime particles in the combustion and reaction zone in the chamber amounts to less than one second. The thoroughly desirable effect is obtained that the time of residence of smaller particles in the combustion and reaction zone is shorter and the period of residence of the large particles is somewhat longer, so that on the one hand a complete calcining of the lime particles is achieved and on the other hand over-heating is avoided. Those particles which are too large or too heavy to be carried in the air flow fall downwards and are collected there and removed. These conditions can be controlled in a simple manner by selecting the speed of the combustion air flow passing upwards in the chamber. The consequence of this is again a very uniform calcining of all lime particles. But in addition, with a view to maintaining the desired temperature in the heat treatment chamber, it is necessary to control introduction of the addition fuel in such a manner that on the one hand no overheating occurs and on the other hand no inadequate temperatures occur. This means that owing to the usually fluctuating calorific value of the combustible substances in the lime sludge the introduction of any additional fuel which may be necessary is to be regulated in accordance with the calorific value of the sludge. A further feature of this process consists in that the air ratio relative to the theoretical quantity of combustion air is between about 1.4 and about 2.5, but preferably between about 1.6 and about 2.0; this means in practice that the quantity of combustion air is regulated so as to maintain the aforesaid air ratio. By means of all the measures described hereinbefore the result is achieved that the CaO particle, independently of the size of the particles, are heated approximately all to the same predetermined combustion temperature which is kept approximately constant, and are heated in a very short time.

If the lime-containing sludge is treated in the aforesaid manner there is obtained a graded, surface-active lime powder of specific particle size, which is carried by a gas flow from which the powder has then to be separated and precipitated. But this is possible in an economical manner with relatively small outlay on apparatus only if the powder particles carried by the gas flow have a sufficiently high surface activity, since in that case they agglomerate to form secondary particles and in this way allow easy separation from the exhaust gas. If there were no activation of the dust particles and thus no formation of secondary particles, the extraction of powder from the outgoing gases would be so expensive as to prejudice the economic aspect of the process.

As a further object, commensurate with the foregoing, in order to prevent any danger of recombination when cooling the finished product in the presence of $CO_2$-containing exhaust gases, it is advantageous in the region of the separating zone to use an air flow to shield the separated hot CaO from the exhaust gas and to mix it with an air flow whereby it is transported further. By means of the air flow the exhaust gas containing $CO_2$ is substantially displaced and separated from the lime dust in such a manner that there is no longer any risk of recombination.

It may also be advantageous to take the air flow from the quantity of air preheated in the heat exchangers, since in this way a very hot mixture of CaO and air is obtained which allows substantial preheating of the combustion air to about 600° C in a heat exchanger, whereby the consumption of fuel can be correspondingly reduced.

The objects aimed at by the invention could not be achieved if the burning process for obtaining CaO using the calorific value of the combustible constituents, more particularly the organic impurities of the sugar sludge, resulted in burning temperatures at which the CaO is over-heated or "dead burned". Therefore, it is particularly important and, in the exemplary process according to the present invention, possible in a relatively simple manner to conduct the calcining process for recovering CaO in such a manner that the organic constituents are completely burned, but over-heating and thus inadequate physical or chemical activity of the CaO are reliably obviated.

An important side object of the process according to the invention results from the production of $CO_2$ which results from the burning of the organic constituents of the sludge or the additional fuel, and which is required in any case for the sugar production and thus can be economically used.

For the best possible economic conditions, raw material, i.e., the lime sludge before introduction into the chamber is preheated by means of exhaust gas heat to a temperature of about 400° to 800° C, preferably over 500° to 600° C. The combustion air is also preheated in an appropriate manner, and preferably to a temperature which is above the calcining temperature.

The sludge is conveniently blown into the heat treatment chamber (calcining chamber) and for this purpose it is advantageous to use a portion of the exhaust gas flow.

If in a sugar production works in which an installation for carrying out the process according to the invention as described hereinbefore is installed, at the beginning of a campaign no lime-containing sludge has been yet obtained from sugar production, or only an inadequate amount, or outside the campaign it is desired to produce burnt lime, the installation can be used without further modifications for the production of the required CaO by using as the starting material additionally to the sludge present or instead of the sludge, finaly ground limestone which is then subjected in the same manner as mentioned to a calcining treatment in order to obtain the desired CaO. If necessary, other calcinable materials with a suitable reaction may also be treated in a similar manner. From this there follows the possibility of using the installation in question also for the production of other graded, surface-active powders for obtaining in an advantageous rational manner suitable high-quality inorganic products.

Further novel features and other objects of this invention will become apparent from the following detailed description, discussion and the appended claims taken in conjunction with the accompanying drawings which disclose an installation for carrying out the process according to the invention for the recovery of lime from predried lime-containing waste sludges.

BRIEF DESCRIPTION OF THE DRAWINGS

FIG. 1 shows a diagrammatic general view of the installation from which the individual parts of the installation and the way they cooperate with one another may be seen;

FIG. 2 shows a cross-section through a particularly advantageous construction of heat treatment chamber for the installation according to FIG. 1; and FIG. 3 shows a simplified view of the heat treatment chamber with dimensional designations;

As FIG. 1 shows, the installation for carrying out the process for the production of lime according to the invention comprises substantially the upright heat treatment chamber (calcining chamber) 11 (see chamber 22 in FIGS. 2 and 3), the preheater for the combustion air 12, the raw material preheater 13 for the starting material or raw material $P_1$ to be treated in the chamber 13, a dust separator 14 and if necessary a further air preheater 15, and also a combustion chamber 16 for an additional temperature increase for the combustion air. Also connected to the installation by way of a change-over device 30, selectively, is the lime milk production installation 17 or a cyclone separator 31. The combustion air L is heated to a specific temperature by means of the air preheater 12, a heat exchanger. For this purpose exhaust gases G' discharged from the dust separator 14 flow through the air preheater 12. The preheated combustion air L' can be supplied either directly or after passing through a further air preheater 15 for further heating to the heat treatment chamber 11. The further heat exchanger 15, used for air preheating, is supplied with the more or less agglomerated, hot lime powder $P_2$ which has been separated in the dust separator 14 from the carrier gas G', and which gives up its heat content as far as possible to the combustion air L' in the heat exchanger 15. If necessary the combustion air L' which has been preheated once or air L" preheated twice can be further heated in the combustion chamber 16 by burning a fuel $F_1$ introduced into the chamber. The hot combustion air is then supplied to the lower end of the upright treatment chamber 11 so that it flows upwards from below in the chamber 11 and temporarily holds in suspension the raw material to be treated which is introduced from above into the chamber 11, while the calcining process takes place. Also introduced into the chamber 11 is additional fuel $F_2$ for maintaining specific operating conditions in the chamber. The raw material $P_1$ to be treated which is introduced into the chamber is preheated by the preheater 13, by means of the hot gas flow G' discharged from the dust separator. If the raw material $P_1$ has already been preheated elsewhere to a sufficiently high temperature, it can be introduced directly into the chamber 11 without having to pass through the preheater 13.

Situated at the bottom of the chamber 11 is an outlet for large lime particles $P_3$ which cannot be carried by the upward flow of gas in the chamber 11 and therefore sinks to the bottom.

The lime powder $P_2$ discharged from the dust separator 14 is introduced, after cooling if necessary in the heat exchanger 15, to the lime milk production apparatus 17 in which it is mixed with a measured quantity of water W. The lime milk M which is produced is then fed to the sugar production installation. The same happens with the discharged gas which contains $CO_2$, which is required for sugar production.

Instead of being supplied to the lime milk production apparatus 17, the cooled agglomerates $P_4$ may also be separated from the protective gas L''' in a conventional separator 31 and discharged from the installation in solid form, for example for building purposes.

The cooled gases G'' issuing from the heat exchanger 12 must usually also be purified in a fine dust separator 18. The residual dust $P'_2$ separated therein is fed together with a carrier gas flow $G''_T$ branched from the gas flow G'' and raw material $P_1$ fed into it into the heat exchanger 13 and the chamber 11. The purified gas flow G''' is then supplied to the sugar production installation where its $CO_2$ content is required.

If heat given off at calcining is required for evaporation of a possible moisture content in the lime sludge, the heat exchangers situated downstream of the dust separator 14 can be wholly or partly replaced by drying apparatus of known type into which the calcining exhaust gases are introduced directly.

In the heat treatment chamber 11 the calcining of the $CaCO_3$ introduced with the preheated lime sludge is carried out, the lime particles being held in supension in the upwardly directed gas flow of the hot combustion air for a more or less long time, but in general only briefly. The lime particles introduced into and mixed with the air flow are so carried by the gas flow that the relatively small particles achieve only a short time of residence in the chamber whereas the larger particles owing to the higher speed at which they descend in the gas flow are carried upwards more slowly than the smaller particles. As a result there is obtained necessarily, and in a desirable manner, a longer period of residence for the relatively large particles which, however, do require a somewhat longer time in order to obtain complete calcining. At the upper end of the chamber the hot reaction gas and the fully reacted lime particles then issue from the reaction zone, to be introduced into the downstream dust separator. In the interests of optimum procedure, to obtain a uniform and high-quality product, it is important that the mixing of the raw material (starting material) with the flow of combustion air in the heat treatment chamber 11 should take place uniformly and without dividing into several flow lines, so that the particles are never over-heated and there is no lack of air at any region in the chamber, so that combustion of the introduced combustible substances would be incomplete and residues would remain.

In order to solve this problem in a particularly simple and advantageous manner, an upright chamber is used in which a vertically downwardly directed central flow is provided into which the raw material is introduced whereas in the peripheral region of the chamber an upwardly directed flow is present. The downwarldy directed central flow is deflected in the lower region of the chamber and introduced into the upwardly directed flow. The additional fuel which may be necessary is introduced like the raw material into the downwardly directed central flow.

FIG. 2 shows a constructional example for an apparatus to be used as the calcining chamber 11 in which it is possible to produce a flow system particularly suitable for carrying out the process. It comprises a rotationally symmetrical, vertically arranged container 21 comprising the chamber 22 into which the heated combustion air L' and L" is introduced by way of an inlet guide device, for example an inlet spiral 23, an equivalent bladed or vaned inlet system or a tangential inlet. As a result a spinning effect is imparted to the combustion air allowing it to flow upwards with a certain peripheral component along the chamber walls. At the same time owing to the rotation of the combustion air a negative pressure is produced in the center of the inlet cross-section which forces some of the combustion air arriving at the upper end of the chamber to turn inwards and flow along the chamber axis downwards to approximately the inlet cross-section. Reference may be made to U.S. Pat. No. 2,935,840 for details of the basic flow principles of this kind of mixing chamber.

In this way it is possible to achieve the desired object of uniform distribution of the raw material $P_1$ over the quantity of air L', L" since the negative pressure in the center of the inlet guide device 23 centers the downwardly moving central flow. This avoids a unilateral distribution of the raw material $P_1$ which result in flow strands. Furthermore, the effect is achieved that by the rotation of the combustion air the particles of raw material $P_1$ from the downwardly directed central flow are brought slowly upwards by centrifugal force and thus into the upward flow. Only the coarse particles $P_3$ which are too heavy for this purpose fall downwards on to the bottom 24 or into the collecting hopper 25 from which they are discharged from time to time by a discharge aperture 26.

The chamber 22 is in the form of a truncated cone which can widen uniformly upwards or, as illustrated, first of all relatively strongly and then to a less considerable extent. The housing wall surrounding the chamber can be bulged outwards to a greater or lesser extent if desired. Experience shows that a purely conical shape with possibly an additional constriction at the lower inlet cross-section gives the best operating results, since in this way a high speed along the wall is obtained which counteracts material being deposited on the wall. If relatively considerable outward bulges are provided the speeds drop in accordance with the increase in cross-section and the risk of solids becoming deposited on the wall is increased.

Tests have shown that mixing of the constituents introduced into the apparatus is particularly intensive if the following dimensioned relationships are observed as FIG. 3 shows:

$D/d = 1.5 \ldots 3$, preferably $1.8 \ldots 2.5$ $l/d = 3 \ldots 4.5$ $b/d = 0.5 \ldots 0.7$ $B/d = 1 \ldots 2$ the angle of the inlet spiral 23 relatively to the peripheral direction being between 5° and 15°, preferably between 7° and 12°.

As previous investigations have shown, this flow pattern is not dependent on the Reynolds number, that is to say does not depend on dimension, speed or temperature of components. This means that extremely simple model laws apply here; observing the ratios given hereinbefore, the dimensions can be increased or reduced in a simple and proportionate manner, whereby the throughputs are varied with the cross-sections and therefore with the square of the dimensions.

The flow speeds are to be so selected in each case that they are sufficient at least for discharging the fine-particle products produced. The heat balance gives the gas quantities and thus the flow cross-sections.

In accordance with the known rules of the spinning principle, the small diameter d can be reduced to about 40% if at the same time the width b of the inlet spiral 23 is increased by the same amount, and vice versa. The peripheral speeds in the inlet spiral 23 and the negative pressure at its center remain approximately unaltered.

If there is a risk of accretions, these can be widened to a considerable extent in the lower region and less considerably in the upper region so that instead of a conical shape, a bellied shape is obtained.

The raw material $P_1$ and the additional fuel $F_2$ are introduced from above through a central aperture 27 in the upper cover 28. For this purpose it is possible for example to provide a conveying device which is not shown here, for example a feed screw. Advantageously the raw material $P_1$ is transported by a flow of carrier gas. This has the advantage that the flow of carrier gas can transport the raw material $P_1$ more easily through the preheater and then introduce it from above vertically downwards and centrally into the return flow in the chamber 22. The additional fuel $F_2$ is also introduced vertically from above into the said return flow, for example through a gas supply pipe or by means of an atomizing nozzle for fuel oil.

In the chamber 22 there is formed between the upward flow near the wall and the central downward flow a vortex zone in which thorough mixing of raw material, additional fuel, air and produced combustion gas is brought about. Since in this zone there is an axial speed of nil as a mean value for the upward throughput flow and the central return flow, it is used at the same time for flame stabilization.

The calcined lime particles forming the finished product $P_2$ issue from the chamber 22 together with the exhaust gas through a radial or tangential outlet 29 to be introduced into the dust separator 14.

In the calcining of $CaCO_3$ there is a risk that the CaO will combine again on cooling with the $CO_2$ from the exhaust gas containing $CO_2$ to form $CaCO_3$. In order to avoid this, the CaO obtained is separated from the hot exhaust gas G' while there is still a sufficiently high temperature in the separator 14.

In order to bring about the desired rapid calcining of $CaCO_3$ and also ignition of the organic constituents or the additional fuel $F_2$ on first contact with the preheated quantity of air L', L", it is advantageous to heat the combustion air to at least the calcining temperature, that is to say about 860° C, but advantageously higher, in order to have a sufficient temperature gradient available for igniting the combustible material and for initiating calcining. According to the invention, temperatures of between 1000° and 1400° C are to be selected.

The upper temperature limit is given by the condition that the always fluctuating constituents of the combustible substances require a certain air surplus, and the ratio of air supply relative to the theoretical quantity of air for combustion should be adjusted to at least 1.20, preferably 1.40 to 1.60.

In order that with a view to having a small and inexpensive apparatus the CaO can be made sufficiently ready to react chemically and physically for the following lime milk production, according to the invention, it is important to keep the times of residence in the combustion zone short and to keep the speed of heating high. the time of residence is not to exceed one second, and the heating speed is to amount to at least 400° per second. As already mentioned, these conditions have to be observed if in the separation of the burnt lime from the hot gas flow an adequate degree of separation is to be obtained with economically acceptable means.

For this purpose, the preheating of the raw material $P_1$ according to the invention can only be taken so far that the organic combustible constituents in the raw material $P_1$ are not yet ignited, or thermally cracked to any considerable extent. Depending on the composition of the organic constituents in the raw material $P_1$, the preheating thereof must not exceed a specific temperature, more particularly a temperature of 800° C, and is preferably to be between 450° and 600° C. Only if few or no organic constituents are present in the raw material $P_1$, the preheating can be taken up to the upper limit of 800° C which is possible according to the present process. The possible preheating temperature is obtained in known manner from the thermal balance of the entire process and depends on how much waste heat is required for drying the sludge.

It is preferable to use as the carrier gas for the raw material $P_1$ a portion of the exhaust gas flow in order to use its available heat content also in this way.

The temperature of the hot gases and therefore approximately also of the finished product $P_2$ on entering the separating apparatus 14, e.g. a dust separator, is, to avoid a recombination of CaO with $CO_2$, to be certain safety amount above the equilibrium temperature of $CO_2$ cracking at the relevant $CO_2$ content of the exhaust gases. At atmospheric pressure this is about 860° C. Therefore, advantageous temperature values are 900° to 950° C. As a result the pre-heating ability of the raw material $P_1$ is limited to about 800° to 850° C, if the organic constituents content or the heat required for sludge drying do not, as mentioned hereinbefore, require a lower limit.

If the raw material $P_1$ does not contain any organic constituents, a correponding quantity of additional fuel $F_2$ must be introduced into the chamber 22. The fuel can be in the form of fine particles, in the form of a gas or an atomized liquid. This is particularly true if the installation for the sugar lime sludge has first of all to be operated for a certain amount of time with ground limestone at the beginning of operations until the first sugar lime sludge is produced from the sugar production process, or if the installation is to be operated outside the sugar campaign for conventional lime production.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for producing calcined lime from sludges containing organic material, comprising the steps of:
   a. so introducing an oxygen-containing gas into the bottom of a rotationally symmetrical reaction zone as to produce an upward flow of the gas in the outer region of the zone and a downward flow of the gas in a central region of the zone surrounded by said outer region;
   b. raising the temperature in said reaction zone to a calcining temperature by preheating the oxygen-containing gas and by introducing fuel into the downward flow of oxygen-containing gas at the upper end of the central region of the reaction zone and thereafter effecting the combustion of the fuel in said reaction zone;
   c. preheating a lime-bearing, raw material to a temperature high enough to insure that said material is dry and pneumatically conveyable;
   d. so introducing the preheated raw material into the upper end of the central region of the reaction zone that said preheated raw material will migrate downwardly through the central region of the reaction zone in admixture with the downwardly flowing gases therein and be deflected outwardly at the bottom of the reaction zone into the upwardly flowing gases in the outer region of the zone to thereby convert calcium compounds in said raw material to calcium oxide;
   e. increasing the temperature of the raw material at a mean rate of not less than 400° C per second in said reaction zone to thereby disrupt the crystalline structure of and disintegrate the raw material into microcrystalline primary particles which have free surface valences and are therefore capable of agglomerating into larger, secondary particles in periods measured in fractions of a second;
   f. limiting the time of residence of the material in the reaction zone and the time that said material is in contact with the hot gases flowing therethrough to a period of not more than one second to thereby maintain the tendencies toward agglomeration possessed by said primary particles;
   g. removing those particles which are too large to be fully calcined in the time required for formation of the primary particles from the bottom of the reaction zone;
   h. removing calcined particles and the gas in which they are entrained from said reaction zone at the upper end thereof, said particles being agglomerated into larger, secondary particles as they are removed from the combustion zone;
   i. separating the secondary particles from the gases with which they are mixed at a temperature at or above said calcining temperature; and
   j. immediately thereafter surrounding the secondary particles with a gas which is inert with respect to said particles to inhibit unwanted reactions between the calcined material and compounds present in the environment of said material.

2. A process as defined in claim 1, wherein the gas in the reaction zone is preheated before it is introduced thereinto by bringing it into heat exchange relationship with gas removed from the reaction zone with the calcined lime particles.

3. A process as defined in claim 2, wherein said gas is further preheated by passing it into heat transfer relationship with the calcined lime particles.

4. A process as defined in claim 2, wherein said gas is further preheated before it is introduced into the reaction zone by heating it in a combustion fired heater.

5. A process as defined in claim 1, together with the step of maintaining the ratio of air of combustion to fuel in said reaction zone in the range of 1.4:1 to 2.5:1 of the theoretical stoichiometric amount of air required for the combustion of the fuel introduced into the reaction zone.

6. A process as defined in claim 5, wherein the ratio of air of combustion to fuel is maintained in the range of 1.6:1 to 2.0:1 of the theoretical stoichiometric amount.

7. A process as defined in claim 1, wherein the gas introduced into the reaction zone is a mixture of air and gas separated from the calcined particles after removal of the latter from the reaction zone.

8. A process as defined in claim 1, wherein the inert gas is air at a temperature sufficiently low to keep the calcined lime particles from undergoing calcium cabonate forming reactions.

9. A process as defined in claim 1, wherein, after the gas removed from the reaction zone with the calcined lime particles is replaced with said inert gas, said particles are transported to a specified location by, at least in part, entraining said particles in said inert gas.

* * * * *

UNITED STATES PATENT OFFICE
CERTIFICATE OF CORRECTION

Patent No. 4,098,871  Dated July 4, 1978

Inventor(s) Fritz Schoppe

It is certified that error appears in the above-identified patent and that said Letters Patent are hereby corrected as shown below:

Column 2, line 62, change "addition" to --additional--.

Column 3, line 9, change "cle" to --cles--.

Column 6, line 47, after "which" insert --would--.

Signed and Sealed this

Third Day of April 1979

[SEAL]

Attest:

RUTH C. MASON
Attesting Officer

DONALD W. BANNER
Commissioner of Patents and Trademarks